Patented May 10, 1932

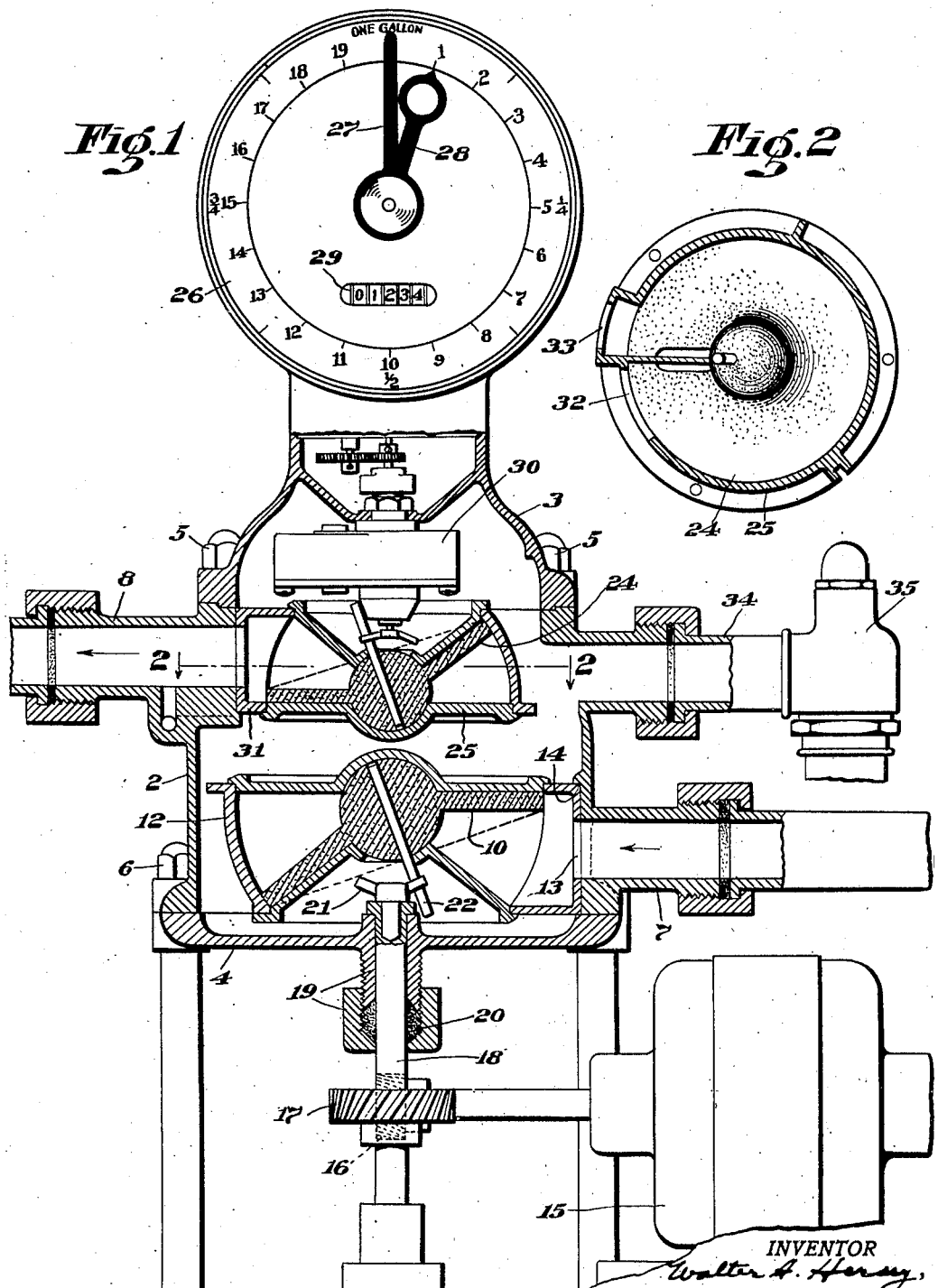

1,858,206

UNITED STATES PATENT OFFICE

WALTER A. HERSEY, OF WELLESLEY, MASSACHUSETTS, ASSIGNOR TO HERSEY MANUFACTURING COMPANY, OF SOUTH BOSTON, MASSACHUSETTS, A CORPORATION OF MASSACHUSETTS

LIQUID DISPENSING APPARATUS

Application filed June 3, 1930. Serial No. 459,064.

This invention relates to apparatus for pumping and measuring liquids and will be herein disclosed as embodied in an organization designed especially for use in dispensing gasoline, light fuel oil, and similar liquids, it being understood, however, that the invention also is useful in connection with the handling of other liquids.

The invention aims to improve apparatus of the character indicated with a view to devising a simple and compact construction, adapted to be manufactured economically and having a high degree of accuracy.

The nature of the invention will be readily understood from the following description when read in connection with the accompanying drawings, and the novel features will be particularly pointed out in the appended claims.

In the drawings,

Fig. 1 is a view, partly in side elevation and partly in vertical section, illustrating an apparatus constructed in accordance with this invention; and Fig. 2 is a horizontal sectional view through one of the disk housings showing the disk in plan.

The organization shown in the drawings comprises a casing which includes a liquid holding casing body 2, a top 3, and a base or bottom 4, the top being secured to the body 2 by bolts, some of which are shown at 5, and the base being similarly secured by bolts, one of which is shown at 6.

The body of the casing is provided with an intake connection or nipple 7 for convenience in coupling the casing to a tank or other source of supply of the liquid, and it also has a discharge nipple 8 which is coupled to the delivery hose or pipe.

The liquid to be dispensed is forced through the casing by a pump which, in the form shown, comprises a nutating disk 10 like those used in water meters, and a housing 12, usually called a "chamber", which operatively supports the disk 10. This chamber is supported in the casing between the base 4 of the casing and an internal shoulder 14 formed on the casing body 2, the inlet port 13 of the chamber registering with the bore of the intake nipple 7.

The pump may be driven from any convenient source of power, but as shown is operated by an electric motor 15, the shaft of this motor carrying a worm 16 which drives a worm wheel 17 secured fast on a vertical shaft 18 which extends through a stuffing box 19 provided on the base 4 of the casing. A packing 20 is held under compression in the stuffing box and prevents any substantial leakage of liquid out of the casing. At its upper end the shaft 18 carries a yoke 21 which engages the spindle 22 of the pump disk 10, and transmits motion from the shaft to the disk, thus driving the disk and causing it to pump liquid from the supply through the chamber 12 and casing 2. It should be observed that the chamber and disk are supported in inverted positions.

The liquid pumped through the casing and discharged through the outlet connection 8 is measured by a meter of some suitable type. As shown, this meter comprising a nutating disk 24, a chamber 25 in which said disk is mounted, registering mechanism including a dial 26, hands or pointers 27 and 28 cooperating therewith, a totaling register 29, and gearing, part of which is enclosed in the housing 30, for transmitting motion from the disk 24 to the registering mechanisms. This meter may be of a type commonly used in measuring liquids except for those changes required to accommodate it to the other parts of the apparatus. The transmitting mechanism of the meter is supported by the casing top 3, and the chamber 25 is clamped between the casing top and an internal shoulder 31 formed on the casing body 2. Preferably the disks 10 and 24 and their chambers are supported horizontally one above the other, approximately in vertical alinement with each other, as shown in Fig. 1, in such a relationship that the outlet port of the pump opens directly into the space in the casing body 2 where it is in free and immediate communication with the inlet port 32, Fig. 2, of the meter chamber 25. The outlet port 33 of this chamber opens directly into the bore of the discharge connection 8.

In using this apparatus for dispensing gasoline, fuel oil, and the like, the discharge pipe or hose preferably is provided with a control valve at the delivery end thereof. Also the pointers 27 and 28 usually are arranged to be reset at will. When the motor 15 is started the pump forces liquid into the casing 2 and discharges it through the meter and the delivery hose when the valve in the hose is open. The flow through the meter is registered on the dial 26, the pointer 27 making one revolution for each gallon of liquid flowing through the meter, and the pointer 28 moving from one gallon indication to the next. The totaling register 29 records the entire flow.

When the valve at the end of the hose or delivery pipe is closed the liquid in the casing 2 will be under considerable pressure unless the motor 15 is stopped, and it is preferable, therefore, to provide a return connection 34 leading from the casing 2 back to the supply tank or into the intake pipe. This connection includes a pressure relief valve 35 of a common type so that no return flow will occur under normal conditions, but such flow will be permitted by the automatic opening of the relief valve when the pressure in the casing builds up to a predetermined degree.

The invention thus provides a pumping and measuring apparatus of very simple organization and of very compact construction, which has a high degree of accuracy, is very convenient to use, and is entirely satisfactory for a wide range of purposes and locations. It is particularly useful in selling gasoline, fuel oil, and the like, but can also be used for other purposes.

While I have herein shown and described a preferred embodiment of my invention, it will be understood that the invention may be embodied in other forms without departing from the spirit or scope thereof.

Having thus described my invention, what I desire to claim as new, is:

1. In a liquid dispensing apparatus, the combination of a pump, a liquid measuring device including an operating element, a single liquid holding casing in which said pump and operating element are mounted in series, and means for driving said pump.

2. In a liquid dispensing apparatus, the combination of a liquid measuring device including a register and operating means therefor, a pump, a single liquid holding casing in which said pump and said operating means are mounted, said casing having intake and discharge connections for the liquid, and mechanism for driving said pump to force liquid through said casing, said measuring device serving to measure the liquid pumped through said discharge connection.

3. In a liquid dispensing apparatus, the combination of a liquid holding casing having intake and discharge connections for conducting liquid into and out of the casing, a pump in said casing in communication with said intake connection, a meter for measuring the liquid pumped through said casing and delivered through said discharge connection, said meter including an operating element mounted in said casing, and means for driving said pump.

4. In a liquid dispensing apparatus, the combination of a liquid holding casing having intake and discharge connections for conducting liquid into and out of the casing, a pump in said casing in communication with said intake connection, a meter for measuring the liquid pumped through said casing and delivered through said discharge connection, said meter including an operating element mounted in said casing and the outlet of said pump being in free and immediate communication with the inlet of said meter, a shaft extending through the wall of said casing and connected with said pump to impart rotary motion thereto, and a motor for driving said shaft.

5. In a liquid dispensing apparatus, the combination of a liquid measuring device including a register and operating means therefor, a pump, a single liquid holding casing in which said pump and said operating means are mounted, said casing having intake and discharge connections for receiving and delivering the liquid to be dispensed, mechanism for driving said pump to force liquid through said casing and through the operating means of said measuring device to actuate said means, a return connection leading from said casing and an automatic relief valve in said return connection for permitting the flow of liquid through said connection when the pressure in said casing builds up to a predetermined degree.

6. In a liquid dispensing apparatus, the combination of a meter comprising an operating disk, a chamber therefor and registering mechanism arranged to be operated by said disk; a pump comprising a pump disk and a chamber therefor; means for driving said pump disk; a liquid holding casing in which said chambers are mounted with the outlet of said pump chamber in free and immediate communication with the inlet of said meter chamber; an intake connection for said casing; and a discharge connection for said casing into which the liquid flowing through said meter is delivered.

7. In a liquid dispensing apparatus, the combination of a liquid holding casing having a body, a base and a top; a pump comprising a pump disk and a chamber therefor; said chamber being mounted between said casing base and a shoulder on said casing body; a meter comprising a disk, a chamber therefor, and a registering mechanism arranged to be operated by the latter disk; the latter chamber being held between said casing top and a shoulder on said casing body; and a motor operatively connected with said pump disk to drive it.

WALTER A. HERSEY.